United States Patent [19]
Engelberger et al.

[11] 3,885,295
[45] May 27, 1975

[54] PROGRAMMED MANIPULATOR ARRANGEMENT FOR ASSEMBLING RANDOMLY ORIENTED PARTS

[75] Inventors: Joseph F. Engelberger; Maurice J. Dunne, both of Newtown, Conn.

[73] Assignee: Unimation, Inc., Danbury, Conn.

[22] Filed: Jan. 21, 1974

[21] Appl. No.: 434,929

Related U.S. Application Data

[63] Continuation of Ser. No. 251,315, May 8, 1972, abandoned.

[52] U.S. Cl. ............... 29/429; 29/200 P; 29/208 C; 29/DIG. 46
[51] Int. Cl. ...................... B23p 19/00; B23p 19/04
[58] Field of Search .. 29/429, 200 P, 208 C, 203 V, 29/211 R, 203 MW, 203 B, DIG. 46; 214/1, 11, 121

[56] References Cited
UNITED STATES PATENTS

| | | | |
|---|---|---|---|
| 3,241,222 | 3/1966 | Timmermans | 29/203 MW |
| 3,276,854 | 10/1966 | Felker et al. | 29/203 B |
| 3,543,910 | 12/1970 | Devol et al. | 214/8.5 |
| 3,583,752 | 6/1971 | Panissidi | 294/88 |
| 3,665,148 | 5/1972 | Yasenchak | 219/80 X |
| 3,667,103 | 6/1972 | Petree | 29/203 V |
| 3,670,386 | 6/1972 | Davis et al. | 29/208 C |

*Primary Examiner*—Thomas H. Eager
*Attorney, Agent, or Firm*—Mason, Kolehmainen, Rathburn & Wyss

[57] ABSTRACT

Programmable manipulator apparatus for interfitting two randomly oriented parts wherein the manipulator arm may not be capable of interfitting one part with the other in response to conventional programming methods. The manipulator arm is programmed to move the parts into engagement while establishing a biasing force tending to facilitate insertion of the parts once they are in correct alignment. One of the parts is then moved in a search area around the desired insertion axis until alignment is achieved whereupon the established biasing force causes the parts to become interfitted.

37 Claims, 8 Drawing Figures

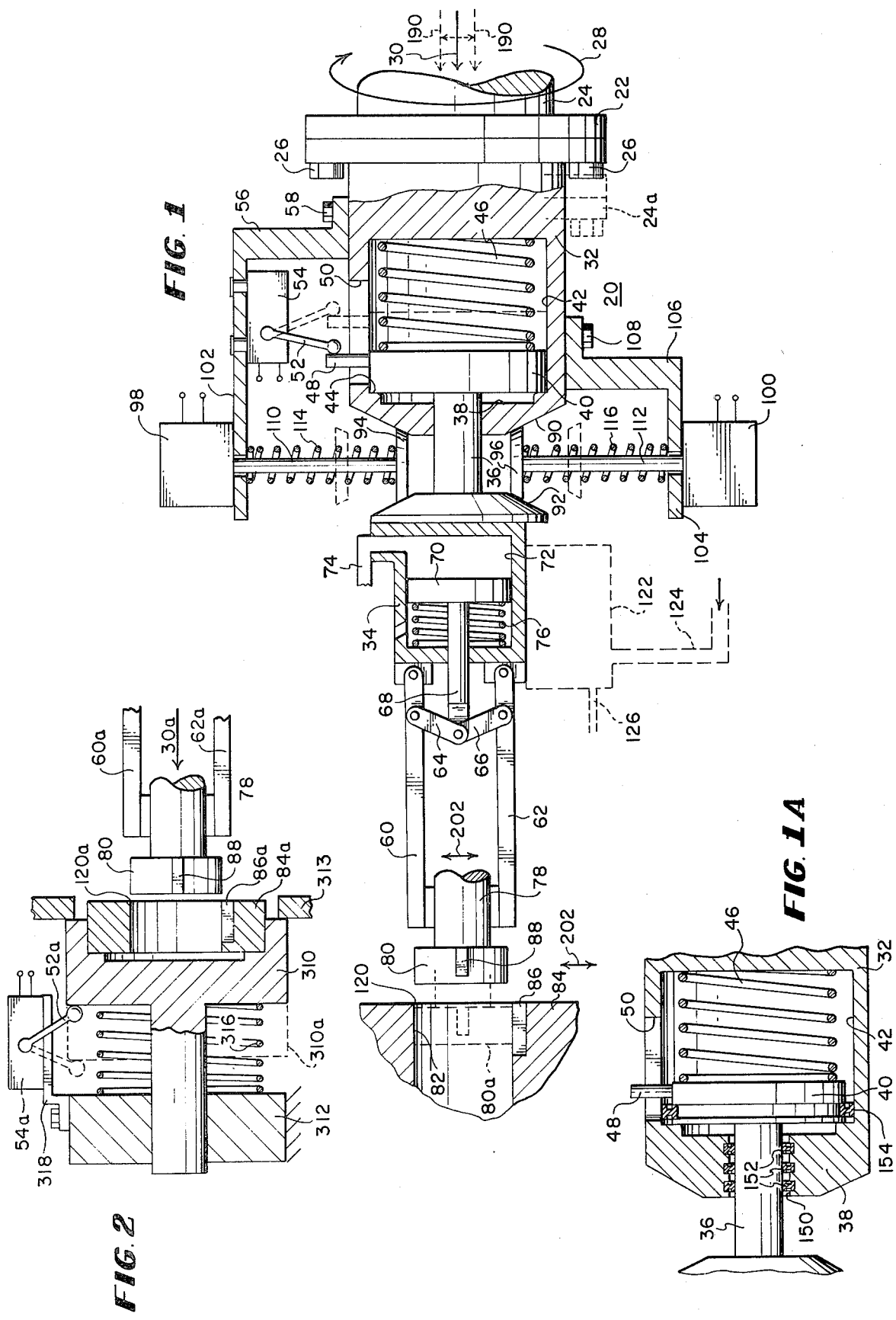

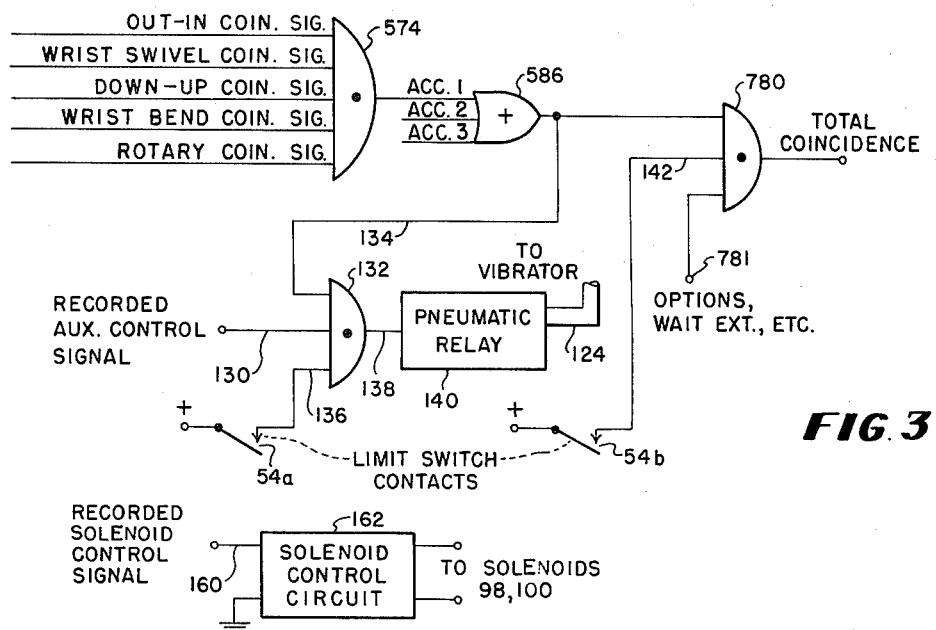
FIG. 3
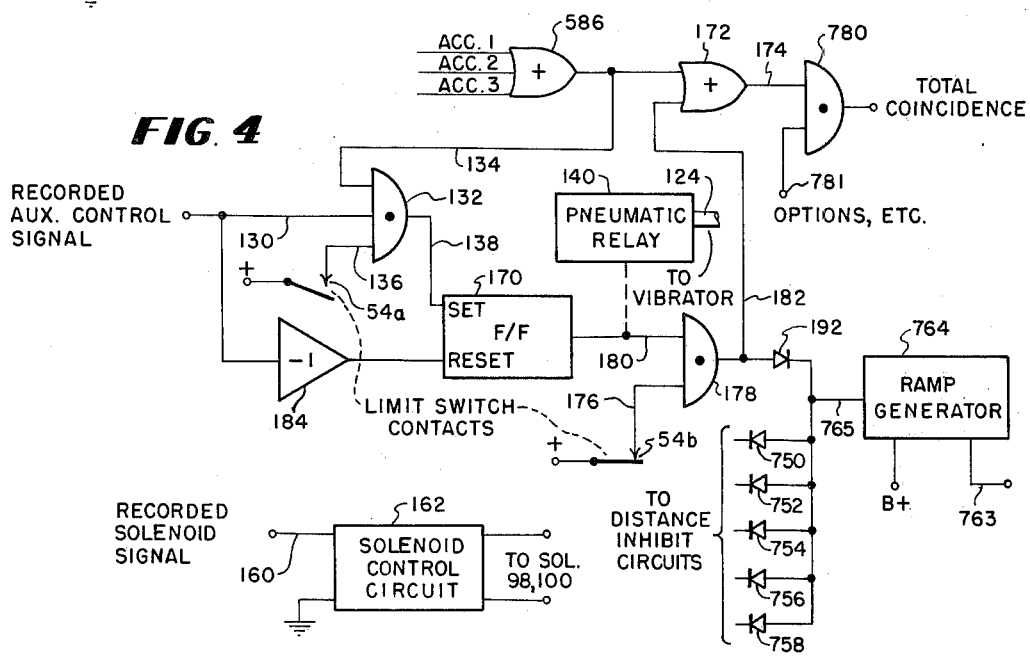
FIG. 4
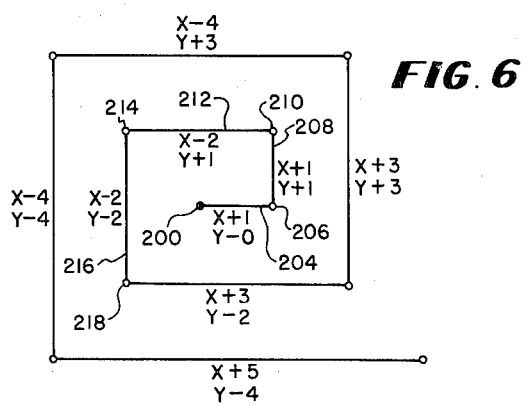
FIG. 6
| INCREMENTAL ROTARY MOVEMANT (X) | INCREMENTAL DOWN-UP MOVEMENT (Y) |
| --- | --- |
| 0 | 0 |
| +1 | 0 |
| +1 | +1 |
| -2 | +1 |
| -2 | -2 |
| +3 | -2 |
| +3 | +3 |
| -4 | +3 |
| -4 | -4 |
| +5 | -4 |
FIG. 7

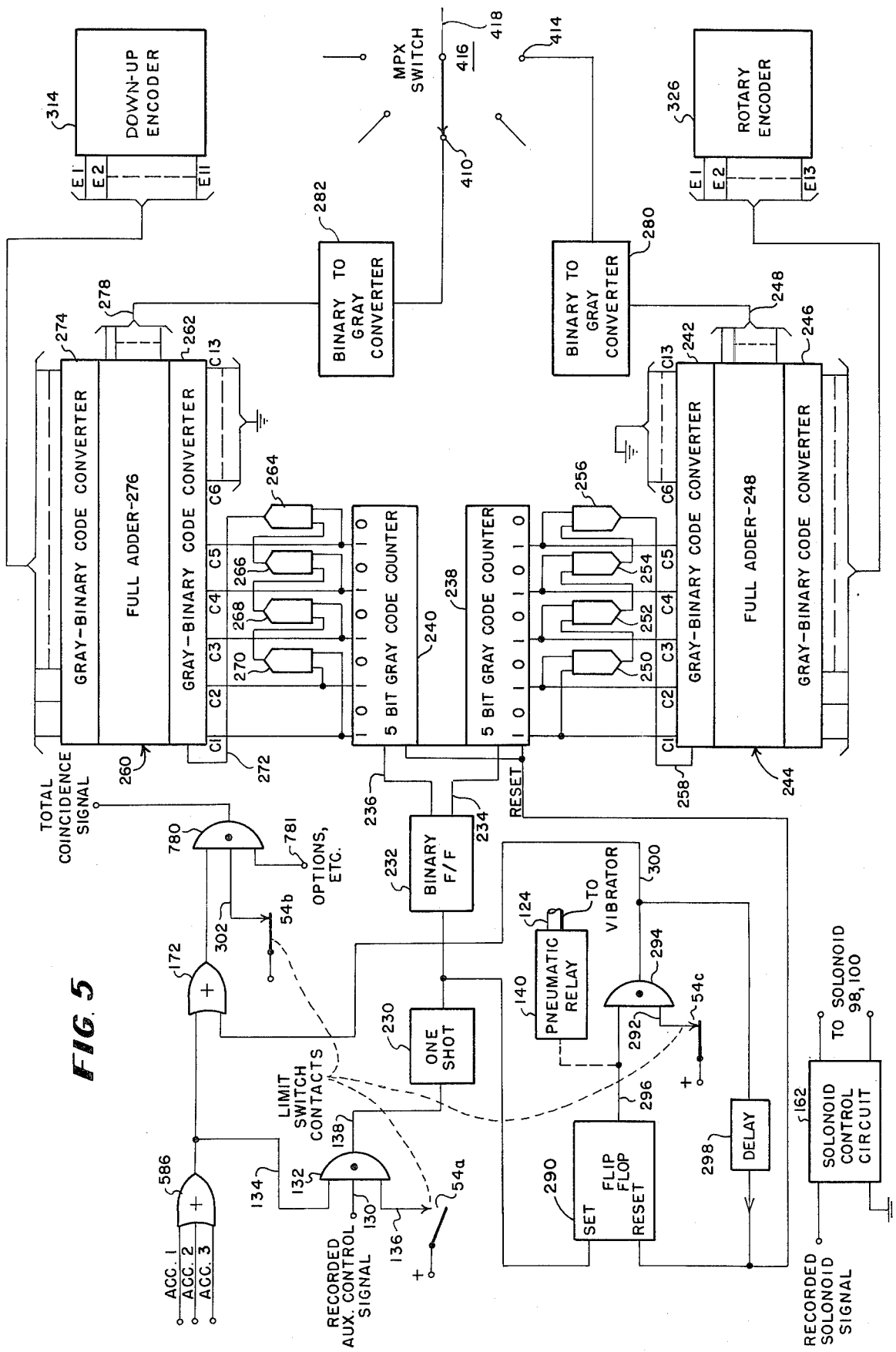

PROGRAMMED MANIPULATOR ARRANGEMENT FOR ASSEMBLING RANDOMLY ORIENTED PARTS

This is a continuation of application Ser. No. 251,315 filed May 8, 1972, now abandoned.

The present invention relates to programmed manipulator arrangements, and, more particularly, to programmed manipulator apparatus which may be employed to assemble randomly oriented parts.

Various types of programed manipulator apparatus have been employed in the past to perform a series of movements over a predetermined, programmable path whereby an article may be picked up at a supply point, transferred to a work station such as a stamping or die casting machine, and after work is performed on the unit the article may be again picked up and transferred to a finished product destination point. Other manipulator arrangements have proposed to pick up articles from a moving conveyor and stack them onto a pallet. Still other manipulator arrangements have proposed to assemble one or more parts on a larger subassembly by means of article gripping manipulator arms. Examples of such manipulator arrangements are shown in Devol U.S. Pat. Nos. 2,988,237; 3,283,918; 3,251,483; 3,306,442; and 3,503,527, and Kenward British Pat. No. 781,465.

In many instances the article picked up by the manipulator arm may need to be either axially aligned or provided with a proper angular orientation, or both, in order to complete the work operation. For example, in situations where a tool is to be inserted into a chuck of a lathe, or the like, it is necessary to provide the exact axial alignment between the tool and the chuck itself before insertion of the tool into the chuck can be performed. In the alternative, a keyway may be present in the chuck which necessitates an exact angular orientation of the tool before it can be inserted into the chuck.

Furthermore, in these situations and other similar instances, it may not be possible to program the movement of the manipulator arm with the degree of accuracy required to insure that the pair of parts may be interfitted simply by movement of the manipulator arm to a programmed position point.

It is, therefore, a primary object of the present invention to provide a programmed manipulator arrangement whereby randomly oriented parts may be interfitted with one another even though the axial alignment or angular orientation of the parts must be extremely accurate.

It is another object of the present invention to provide a new and improved programmed manipulator arrangement for inserting one part into another interfitting part wherein facilities independent of the normal program are employed to insure interfitting of the part to a high degree of accuracy.

It is a further object of the present invention to provide a new and improved programmed manipulator arrangement for the interfitting or assembly of parts which require alignment or registration to a greater accuracy than the positional accuracy of the manipulator arm by causing the arm to move in a search area around the programmed alignment point while establishing a biasing force tending to promote interfitting of the parts once they are precisely aligned.

It is another object of the present invention to provide a programmed manipulator arrangement wherein the manipulator arm is first moved to a programmed point in a multistep program and is thereafter moved in response to a series of artificially developed search signals before the next step of the program is selected.

It is still another object of the present invention to provide a new and improved programmed manipulator arrangement wherein the manipulator arm is first moved to the position corresponding to a particular program step and the position representing encoder output of the manipulator arm is artificially altered to cause the arm to be moved in a predetermined manner before the next step in the program is selected.

Briefly, in accordance with one aspect of the invention, one part of a pair of parts to be interfitted is gripped by the manipulator arm and is moved along the insertion axis of the parts to a point at which the parts engage and a biasing force is established tending to cause the parts to be interfitted. One of the parts is then moved in a search area around the insertion axis by an amount such that the biasing force established between the parts urges the parts into interfitting relationship by movement along the insertion axis. In one embodiment this search area is provided by vibrating the article gripping means mounted on the end of the manipulator arm while providing shock mounting means for preventing transmission of the vibration back to the position indicating encoders of the manipulator arm so that false error signals will not be developed in response to such vibration. The search area is made sufficiently large to insure that the parts are interfitted by the established biasing force once the parts have been moved to the programmed point by the manipulator arm.

In another embodiment, the part to be interfitted is gripped by the manipulator arm and moved to a programmed position at which a biasing force between the pair of parts is established and further movement of the gripped part, as for example, by rotation around the insertion axis, is performed until the desired angular orientation of the parts is achieved and the biasing force thereafter causes the parts to become interfitted.

In a further embodiment of the invention, the part to be interfitted is moved to a first programmed position at which the parts are in engagement and a biasing force established therebetween and thereafter the part is moved by the manipulator arm through a programmed series of small increments around the central position until exact alignment of the insertion axes of the parts is achieved or exact angular orientation thereof is achieved, following which further movement of the manipulator arm in accordance with further steps in the search pattern is discontinued and the next succeeding program step following the search pattern is selected.

In a still further embodiment of the invention, the part which it to be interfitted is first gripped by the manipulator arm and moved to a central programmed position at which the desired biasing force between the parts is established. The manipulator arm is thereafter caused to move in a spiral search pattern by the introduction of successive artificial command signals which are compared with the encoder signal in each controlled axis of the spiral movement, this spiral search movement continuing until exact alignment of the parts is achieved and they become interfitted. Once interfitting of the parts is achieved, the manipulator arm is then moved to the next program step of the main program.

The invention, both as to its organization and method of operation, together with further objects and advantages thereof, will best be understood by reference to the following specification taken in connection with the accompanying drawings in which:

FIG. 1 is a fragmentary side elevational view of a manipulator arm assembly wherein certain features of the present invention are provided;

FIG. 1A is a fragmentary side elevational view of an alternative embodiment of the invention similar to FIG. 1 but wherein shock mounting means are provided for preventing transmission of vibrations to the manipulator arm encoders during the search operation;

FIG. 2 is a sectional side elevational view of a further alternative embodiment of the invention wherein a biasing force is established by a different one of the interfitting parts;

FIG. 3 is a schematic diagram of a first control arrangement which may be employed in the manipulator assembly arrangements of either FIG. 1 or FIG. 2;

FIG. 4 is a schematic diagram of an alternative control arrangement which may be employed in connection with the apparatus of FIG. 1 or FIG. 2;

FIG. 5 is a schematic diagram of a still further circuit arrangement which may be employed with the manipulator arm assembly arrangement of either FIG. 1 or FIG. 2;

FIG. 6 is a diagrammatic illustration of the search path pattern established by the control circuit arrangement of FIG. 5; and FIG. 7 is a table illustrating the incremental movements provided with the search pattern of FIG. 6.

Referring now to the drawings, and more particularly, to FIGS. 1 and 3, thereof, the manipulator arm assembly, indicated generally at 20 in FIG. 1 of the present invention, is arranged to function with and will be described in connection with programmed manipulator apparatus of the type described in copending Dunne, et al. application Ser. No. 64,802 filed Aug. 18, 1970, now U.S. Pat. No. 3,661,051, said Dunne, et al., application being itself a continuation of an earlier application Ser. No. 808,152 filed Mar. 18, 1969, now abandoned. Reference may be had to said copending Dunne, et al., application for a complete and detailed description of the programmed manipulator apparatus itself and in certain instances in the present description the same reference numerals will be assigned to elements which correspond to chose described in detail in said Dunne, et al., application.

For the purposes of the present invention, however, it may be generally stated that the apparatus includes an hydraulically powered manipulator arm which is mounted so as to provide five programmed articulations or degrees of freedom for the manipulator arm. These five degrees of freedom are identified as a rotary axis wherein the boom assembly is rotatable about a fixed vertical axis, an up and down axis movement wherein the boom is pivotally mounted for movement about a horizontal axis, an in out axis wherein the boom assembly includes extendable arm portions which are movable in a so-called "radial" or extension and retraction movement along the longitudinal axis of the tiltable boom assembly. A so-called hand assembly is mounted on the end of the extendable boom assembly, this hand assembly being movable about an axis perpendicular to the boom extension axis to provide a so-called wrist bend movement and the hand assembly is also rotatable about the longitudinal axis of the boom assembly to provide a so-called wrist swivel motion of the hand assembly.

An article gripping arrangement is normally provided on the end of the hand assembly so that an article can be gripped between a pair of jaw members and then moved in the above-described five degrees of freedom and over a path corresponding to a sequence of positions which are initially programmed into the manipulator apparatus during the teaching mode of the apparatus. Once the hand assembly has been taught to grasp an article and move it in the desired path to the desired destination point, the manipulator apparatus may then be placed in a repeat mode of operation in which the manipulator arm repetitively goes through the same cycle of movements so that a series of articles may be grasped, moved through the desired series of work operations and deposited at the desired destination point.

In the present invention, the conventional article gripping means is replaced by the assembly 20 which is mounted on the flange portion 22 of the wrist swivel member 24 of a conventional manipulator apparatus such as described in detail in the above-identified copending Dunne, et al., application now U.S. Pat. No. 3,661,051, by means of the bolts 26. The member, and hence the assembly 20 attached thereto, is arranged to be moved through the above described five degrees of freedom including the wrist swivel motion as indicated by the circular arc 28, and a radial or in out motion along the longitudinal axis of the manipulator arm which will coincide with the arrow 30 when the boom assembly is in the horizontal position.

Basically, the assembly 20 comprises a first body portion 32 which is rigidly mounted to the flange 22 by means of the bolts 26, and a second body portion 34 which is slidably mounted in the body portion 32 so that the body portion 34 may be moved with respect to the body portion 32 along the insertion axis 30. Thus, the body portion 34 is carried by the central rod 36 which is slidably mounted in the end wall 38 of the body portion 32, the rod 36 being secured to a pistonlike member 40 which is slidably mounted within a chamber 42 provided in the body portion 32 and is biased against a shoulder 44 formed in the end wall 38 by means of a coil spring 46. The piston 40 carries an upwardly extending member 48 which moves within a slot 50 provided in the body portion 32 and engages the pivot arm 52 of a limit switch control mechanism indicated generally at 54 which is mounted on bracket 56 secured to the body portion 32 by means of the bolts 58.

In the illustrated embodiment the body portion 34 is provided with article gripping means comprising a pair of opposed fingers 60 and 62 which are pivotally mounted on the forward end of the body portion 34 and are arranged to be actuated through toggle links 64 and 66 which are connected to the piston rod 68 which extends through the forward wall of the body portion 34. The piston rod 68 is connected to the pneumatically actuated piston 70 within the hollow chamber 77 provided in the body portion 34 and clamping air pressure is supplied through the air hose 74 in timed sequence with movements of the manipulator arm 24, as described in detail in said copending Dunne, et al., application.

When air is supplied to the hose 74 the piston 70 is moved forwardly in the chamber 72 against the biasing force of the coil spring 76 so that the fingers 60 and 62 may grip an article of any desired configuration and move it through the desired sequence of work operations. In this connection it will be understood that the illustrated article gripping means is only one of many different types of article gripping arrangements which may be provided in the movable body portion 34, insofar as the present invention is concerned.

In the illustrated embodiment, the article which is grasped by the fingers 60 and 62 is provided with a cylindrical shank portion 78 and a cylindrical head portion 80 which is to be inserted into the mating opening 82 in a member 84. The member 84 may comprise, for example, the rotatable chuck of a machine tool into which the head portion 80 of the cutting tool is to be inserted. Also, the opening 82 of the member 84 may include a keyway 86 and head portion 80 of the article to be inserted may be provided with a corresponding key 88 which must be angularly oriented so as to coincide with the orientation of the keyway 86 before the head portion 80 can be inserted into the opening 82. In this connection it will be understood that in many instances the member 84 may itself be rotatable and may have been stopped at the end of the previous operation at any random angular orientation so that it is not possible to pick up the article 78 with the exact orientation of the key 88. It will also be understood that insofar as the present invention is concerned a wide variety of other types of interfitting parts may be assembled. In general, these parts may be classified in two types, one type requiring only that the insertion axes of the mating or interfitting parts be accurately aligned, and the other type requiring that the angular orientation of the two interfitting parts be accurately aligned, for example, the illustrated keyway and key 86 and 88 shown in FIG. 1.

During most of the operations of the manipulator apparatus and indeed in all applications where insertion of one part into another closely interfitting part is not required, it is desirable to have the body portion 34 rigidly connected to the body portion 32 so that accurate positioning of the article which has been gripped may be achieved in accordance with the programmed positioning of the manipulator arm member 24. Accordingly, the body portion 32 is provided with a conical end surface 90 and the body portion 34 is provided with a rearwardly facing conical surface 92, these opposed conical surfaces forming wedging surfaces into which a pair of opposed wedging members 94 and 96 may be moved under the control of opposed solenoids 98 and 100. The solenoid 98 is mounted on an extension portion 102 of the bracket 56 and the solenoid 100 is mounted on an extension portion 104 of a bracket 106 secured to the body portion 32 by means of the bolts 108. The movable plunger 110 of the solenoid 98 carries the wedging member 94 and the movable plunger 112 of the solenoid 100 carries the wedging member 96, the coil springs 114 and 116 being provided so that in the absence of energization of the solenoids 98 and 100 the members 94 and 96 are forced into wedging engagement with the opposed conical surfaces 90 and 92 so that the body members 32 and 34 are rigidly connected together. When it is desired to permit the body portion 34 to move axially with respect to the body portion 32, the members 94 and 96 may be removed to the dotted positions shown in FIG. 1 by energization of the solenoids 98 and 100 so as to permit rearward movement of the body portion 34 with respect to the body portion 32 against the force of the biasing spring 46.

Considering now the operation of the arrangement described thus far, after the article to be inserted has been gripped by the fingers 60, 62 and the manipulator arm 24 has been positioned for axial movement along the insertion axis 30, the solenoids 98 and 100 are energized to remove the wedging members 94 and 96 and the entire assembly 20 is then moved forwardly along the insertion axis 30 toward the member 84. Considering first the situation in which only alignment of the insertion axes of the interfitting parts is required, when the head portion 80 is moved toward the member 84 it may enter the opening 82 and be properly positioned therein, in which case no relative movement between the body portions 34 and 32 is experienced. However, if the accuracy with which the manipulator arm 24 can be positioned is not sufficiently precise to align the parts to a sufficiently high degree of accuracy to permit insertion, a condition which may well be experienced if the head portion 80 and opening 82 have a very close tolerance fit, the forward edge of the head portion 80 will strike the lip portion 120 of the opening 82 at some point around its circumference so that the head portion 80 is thereafter prevented from moving into the opening 82. When this occurs the body portion 34 can no longer move forwardly. However, the manipulator arm portion 24 and the attached body portion 20 continue to move forwardly along the insertion axis 30 since the arm is programmed to move to a point at which the head portion 80 is fully seated within the opening 82. Accordingly, as the body portion 32 continues to move forwardly, a biasing force is established by compression of the spring 46 which tends to promote insertion of the head portion 80 into the opening 82 and the pin 48 moves the switch lever 52 rearwardly to the dotted position shown in FIG. 1. Movement of this lever 52 to the dotted position shown in FIG. 1 actuates the limit switch 54 and is employed in accordance with the present invention to produce different types of movement of the body portion 34 so as to promote insertion of the head 80 into the opening 82 under the established biasing force of the spring 46.

In one embodiment of the invention a pneumatic vibrator 122 (FIG. 1) is secured in any suitable manner to the body portion 34 and is supplied with shop air through the hose 124 under the control of the control circuit arrangement shown in FIG. 3, the vibrator 122 being provided with a suitable air vent 126. In FIG. 3 certain control circuit elements have been given the same reference numerals as the corresponding elements in the above-identified copending Dunne, et al. application and reference may be had to said application for a complete and detailed description thereof. However, for the purpose of the present invention, it may be stated that each of the five controlled axes of the manipulator apparatus is provided with facilities for producing a coincidence signal, derived from the direction signals of the associated circuitry, all of such coincidence signals being supplied to a five-point input AND-gate 574. Accordingly, when the manipulator arm has been moved to the position corresponding to a particular program step in all five axes an output is derived from the AND-gate 574 which is supplied over the lead identified as Accuracy 1 to an OR-gate 586. The OR-gate 586 also has two other inputs identified as Accuracy 2 and Accuracy 3 which receive artificial coincidence signals when the manipulator arm has moved to within a predetermined percentage of the programmed distance. However, these Accuracy 2 and Accuracy 3 circuits are not utilized unless a corresponding control signal is programmed during the teaching operation, as described in detail in said copending Dunne, et al., application.

During the teaching operation of the present invention, an auxiliary control signal is recorded in conjunction with the program step which calls for the fully inserted position of the manipulator arm 24, i.e., the position of the head portion 80 shown in dotted lines in FIG. 1 as 80a. However, as described generally heretofore, if the head portion 80 and opening 82 are not in exact alignment the head portion will strike the lip 120 and be held up as the manipulator arm 24 continues to move along the insertion axis 30. A signal corresponding to the recorded auxiliary control signal is sensed at the program step calling for the position 80a and is supplied by way of the conductor 130 to a three-input AND-gate 132, the output of the OR-gate 586 also being supplied over the conductor 134 as the second input of the gate 132. In addition, a set of limit switch contacts 54a of the limit switch 54 which are normally open when the limit switch is in the position shown in full lines in FIG. 1, are arranged to supply a control potential by way of the conductor 136 to the third input of the AND-gate 132 when these contacts are closed.

When the head portion 80 strikes the lip 120 and the control lever 52 is moved to the dotted position shown in FIG. 1, the contacts 54a of the limit switch 54 are closed and an enabling signal from a suitable source of potential is supplied over the conductor 136 to the third input of the AND-gate 132. However, an enabling signal is not produced on the conductor 134 until an output is derived from the OR-gate 586, i.e., when the manipulator arm is moved to the forward programmed position corresponding to the full insertion position 80a of the head portion 80. In this connection, it will be understood that only the body portion 32 is moved to this fully forward position of the manipulator arm since the head portion 80 is hung up on the lip 120 and is thereby prevented from being inserted into the part 84.

When the manipulator arm is thus moved to the full insertion position an enabling signal is provided on the conductor 134 so that the AND-gate 132 is enabled and an output signal is developed on the output conductor 138 thereof which is supplied to a pneumatic relay 140. The relay 140, which may be of any conventional type, is controlled by the enabling signal on the conductor 138 to supply air through the hose 124 to the pneumatic vibrator 122 so that the body portion 34 of the assembly 20 is vibrated and the head portion 80 is thus moved through a predetermined search area determined by the amplitude of vibrations set up by the vibrator 122 around the opening 82. This search area established by the vibration of the body portion 34 is sufficient to cause the head portion 80 to move into exact alignment with the opening 82 whereupon the biasing force of the coil spring 46 forces the head portion 80 into the opening 82 to the full insertion position 80a shown in FIG. 1. When this occurs the piston 40 and its associated member 48 move forwardly so that the limit switch 54 is returned to its initial position and the contacts 54a thereof are opened. Opening of the contacts 54a removes the enabling signal from the lead 136 with the result that the pneumatic relay is de-energized and vibration of the body portion 34 is terminated.

In the manipulator apparatus described in the above-identified copending Dunne, et al., application the output of the OR-gate 586 is employed immediately to shift the read heads of the associated magnetic drum to select the next program step so that the manipulator arm may be continuously moved through a sequence of desired motions in an efficient and rapid manner. However, in the arrangement of the present invention the manipulator arm 24 should not be moved away from the insertion axis 30 until the head portion 80 has been inserted into the opening 82 even though the manipulator arm 24 has itself been moved to the full insertion position 80a in the manner described above. In accordance with a further aspect of the present invention, the limit switch 54 is provided with a second set of contacts 54b which are normally closed and supply an enabling signal from a suitable potential source over the conductor 142 to an AND-gate 780. As described in the above-identified copending Dunne, et al., application, the AND-gate 780 receives an enabling input from the OR-gate 586 and also receives one or more enabling inputs indicated by the conductor 781, corresponding to various option signals such as wait external, etc. If an enabling signal is present on the conductor 781, the AND-gate 780 would, in the absence of the control lead 142 provide a total coincidence signal as soon as a total position signal is produced by the OR-gate 586 and the next program step would be selected. However, if the head portion 80 becomes hung up on the lip 120 as the manipulator arm is moved to the full insertion position 80a, and the limit switch control lever is moved to the dotted line position shown in FIG. 1, the contacts 54b are opened prior to movement of the manipulator arm 24 to the full insertion position 80a. Accordingly, the output developed by the OR-gate 586 when this occurs is not transmitted through the AND-gate 780 and no total coincidence signal is produced so that the next program step is not selected. The manipulator arm 24 thus remains at the program position 80a while the body portion 34 is vibrated and the head portion 80 is inserted into the opening 82 under the force of the biasing spring 46. When full insertion of the head portion 80 is achieved, however, the limit switch contacts 54b are again closed so that an enabling signal is provides on the conductor 142 and a total coincidence signal is then produced at the output of the AND-gate 780 which is employed to select the next program step. This next program step would be recorded during the teaching operation as a signal removing air from the hose 74 so that the gripping fingers 60 and 62 are released from the shank portion 78 of the inserted member and the next program step thereafter would call for movement to the next position in the desired sequence of motions of the manipulator apparatus.

While the amplitude of vibration of the body member 34 need not be extremely large since the head portion 80 may be only very slightly misaligned from the opening 82, it is nevertheless desirable to prevent these vibrations from being transmitted back to the manipulator arm 24. Transmission of such vibrations to the manipulator arm 24 could cause movement of the encoders associated with each of the five axes of movement of the manipulator arm which would be falsely interpreted as movement away from the desired coincidence point so that the coincidence signal supplied to the AND-gate 574 could disappear in one or more of the controlled axes with the result that the enabling input on the conductor 134 would disappear and the pneumatic relay would become de-energized and vibration of the head portion 80 would be prematurely terminated. To prevent this, the body portion 34 may be mounted within the body portion 32 in such manner as to permit slight vibrational movement of the body portion 34 without transmission of these vibrations to the body 32, portion 32, as shown in FIG. 1A. Referring to this Figure, the central rod 36 is mounted within the bearing opening 150 of the end wall 38 by means of a series of double U-cup seals 152 which are positioned within corresponding grooves in the bearing opening 150 and slidably support the central rod 36. Also, the piston 40 is mounted within the housing chamber 42 by means of a double U-cup seal 154 which engages the walls of the chamber 42 as the piston 40 moves rearwardly into this chamber. With the arrangement shown in FIG. 1A the body portion 34 is resiliently mounted by means of the U-cup seals 152 and 154 so that the limited amplitude vibration which is produced when the vibrator 122 is energized is not transmitted to the main body portion 32. However, it will be understood that any other suitable shock mounting arrangement may be employed for resiliently mounting the slidable body portion 34 within the housing 32 so as to damp the vibrations produced during periods when the vibrator 122 is energized.

As discussed generally heretofore, the wedging members 94 and 96 must be removed from between the body portions 34 and 32 in order to permit the above-described sliding movement of the body portion 34 when interference between the interfitting parts is experienced during the insertion operation. To this end, a solenoid control signal is recorded during the teaching operation in association with the program step which commands the manipulator arm 24 to move to the full insertion position 80a. This control signal is supplied over the conductor 160 to a solenoid control circuit 162 which provides adequate power to energize the solenoids 98 and 100. When these solenoids are energized, the wedging members 94 and 96 are removed from between the members 34 and 32 as the head portion 80 moves toward the insertion position and before it may strike the lip 120 of the insertion opening 82. Accordingly, the member 34 is thereafter free to be moved toward the body portion 32 as the manipulator arm continues to move to the full insertion position. When the head portion 80 is moved to the full insertion position 80a and a total coincidence signal is achieved in the manner described above, the next program step is selected and since no solenoid control signal is recorded in association with this step the solenoids 98 and 100 are immediately de-energized and the coil springs 110 and 112 force the wedging members 94 and 96 into engagement with the body portions 34 and 32 so that a rigid article gripping structure is thereafter provided for subsequent operation of the manipulator apparatus.

In the preceding description of FIG. 1 and the control circuit of FIG. 3 it has been assumed that the keyway 86 and key 88 are not provided on the interfitting parts so that the only problem is that of obtaining the proper alignment of the insertion axes of the respective interfitting parts, and once this axial alignment is achieved, the parts will be completely interfitted in the desired manner. In the event that the keyway 86 and key 88 are present on the respectively interfitting parts, it will be evident that an additional angular orientation of the interfitting parts may be necessary before they will completely interfit. In this connection it is assumed that either the part which is grasped by the fingers 60, 62 or the part 84 has a random angular orientation with respect to the other part, as would be the case if a tool receiving chuck, or the like, stopped at a random angular position.

The control circuit arrangement of FIG. 4 may be employed to carry out an angular orientation search or scanning operation with the apparatus of FIG. 1 and with or without the pneumatic vibrator 122. Thus, referring to FIG. 4, the AND-gate 132 functions in the manner described in detail heretofore in connection with FIG. 3 to provide an output signal on the conductor 138 as the manipulator arm 24 is moved to the full insertion position 80a and the limit switch 54 is actuated so that the contacts 54a thereof are closed. The signal produced on the conductor 138 is employed to set a flip-flop circuit 170 so that the pneumatic relay 140 is energized and air is supplied to the vibrator 122 if this vibrator is required.

When an angular orientation is required between the interfitting parts, an additional program step is recorded during the teaching operation following the positioning of the manipulator arm 24 to the full insertion position 80a. In this form of operation of the circuit of FIG. 4, it is assumed that the article is picked up by the fingers 60, 62 with a predetermined orientation of the key 86 and with the manipulator arm 24 at one extreme end of the wrist swivel movement provided by the manipulator apparatus. Accordingly, the head portion 80 is moved into engagement with the part 84 and the spring 46 is compressed to provide the desired biasing force while at the same time the limit switch 54 is actuated with the key 88 at a particular angular orientation with respect to the other part 84. The next program step following the full insertion position 80a is the identical position as the full insertion position 80a except for the fact that the wrist swivel axis is programmed to the other extreme of movement which is usually somewhat less than 360°. Accordingly, in the circuit arrangement of FIG. 4 the total position signal developed by the OR-gate 586 when the manipulator arm has been moved to the full insertion position 80a is supplied through a two-input OR-gate 172 and over the conductor 174 to the main AND-gate 780 the output of which forms the total coincidence signal which controls selection of the next program step.

In the embodiment of FIG. 4, the second set of limit switch contacts 54b are not utilized to control the AND-gate 780 so that this gate is not prevented from responding to the total position signal appearing on the conductor 174. Accordingly, as soon as the parts have been moved into engagement and the coil spring 46 compressed as the manipulator arm is moved to the full insertion position 80a, a total coincidence signal is produced and the next program step is selected. This next program step also has recorded therewith an auxiliary control signal which is supplied to the AND-gate 132 over the conductor 130. However, since a new command signal has been introduced, i.e., the command to move in the wrist swivel axis to the other end of the range of movement of this axis, no enabling signal is produced on the conductor 134. However, since the flip-flop 170 has already been set by the previous program step this flip-flop remains in the set position as the manipulator arm 24 is rotated about the axis 30 to perform a wrist swivel movement. As this occurs, the key 88 is rotated about the axis 30 and eventually finds the keyway 86 of the interfitting part 84. When this occurs the biasing force of the spring 46 causes the head portion 80 to move to the full insertion position 80a with the key 88 moving within the keyway 86. As this forward movement of the body portion 34 occurs the limit switch 54 is returned to its initial position and the contacts 54a thereof are open. At the same time, the limit switch contacts 54b which are normally closed but which are opened in response to actuation of the limit switch 54 as the coil spring 46 is compressed, are again closed so that an enabling signal is supplied from a suitable source of potential over the conductor 176 to one input of a two-input AND-gate 178. The other input to this AND-gate is supplied from the flip-flop 170 over the conductor 180. Since the flip-flop 170 remains set, after the original enabling signal is supplied over the conductor 138, the AND-gate 178 is now enabled and supplies an output signal on the conductor 182 when the key and keyway 88, 86 match and the head portion 80 is moved to the full insertion position 80a in the manner described heretofore. The signal on the conductor 182 passes through the OR-gate 172 and the total coincidence AND-gate 780 so as to provide a total coincidence signal which is then employed to select the next program step.

It will be noted that selection of the next program step occurs in response to movement of the head portion 80 to the full insertion position 80a when the key 88 is aligned with the keyway 86 and not when the programmed wrist swivel movement of the member 24 is completed. It will also be noted that the AND-gate 178 is not enabled when the flip-flop 170 is first set in response to the enabling signal on the conductor 138 because this enabling signal does not appear on the conductor 138 until the full insertion position 80a of the member 24 is achieved and by the time this position is achieved the contacts 54b have been opened as the coil spring 46 is compressed. Accordingly, no artificial coincidence signal is developed on the conductor 182 in response to the intial inward movement of the head portion 80 into engagement with the part 84. However, when the head portion 80 has been rotated by an amount sufficient to match the angular orientations of the key 88 and the keyway 86 and the head portion 80 then moves to the full insertion position 80a an artificial coincidence signal is produced in the manner described above and the next program step is selected even though the full wrist swivel movement originally programmed has not been completed.

The next program step following the programmed full wrist swivel movement will normally be to open the fingers 60, 62 and no auxiliary control signal is recorded in association with this program step during the teaching operation. Accordingly, in the absence of an auxiliary control on the conductor 130 a signal is supplied from the inverter 184 to the reset terminal of the flip-flop 170 so that this flip-flop is reset to its initial condition after the parts have been matched in angular orientation and moved to the full insertion position in the manner described above. In the alternative, the next program step could be a command to drive the part further home within the keyway instead of removing the fingers 60, 62.

In the circuit arrangement of FIG. 4, the solenoid control circuit 162 is employed to respond to a recorded solenoid control signal and energize the solenoids 98, 100, in the manner described in detail heretofore in connection with FIG. 3 so that the body portion 34 is free to move with respect to the body portion 32 as the spring 46 is compressed. As discussed generally heretofore, the pneumatic vibrator 122 may, if desired, be employed with the circuit of FIG. 4 and this vibrator will continue to vibrate the body portion 34 until the head portion 80 has been moved to the proper angular orientation and then inserted to the full insertion position 80a. However, as soon as the contacts 54b are again closed and the next program step is selected, the flip-flop 170 is reset and the vibrator 122 is de-energized. In this connection it will be understood that in many situations an extremely precise alignment of the insertion axes of the respective interfitting parts is not required, the only requirement being that the parts be angularly oriented to accomplish the desired interfitting movement. Under such conditions the vibrator 122 may be eliminated. In this connection, it will be understood that the biasing spring 46 preferably exerts a relatively light biasing force on the parts to be interfitted so that they can be either vibrated or rotated with respect to one another while being biased into engagement.

The circuit arrangement of FIG. 4 may also be employed with a somewhat different programming arrangement to achieve insertion of two interfitting parts which do not require angular orientation. In this different arrangement the pneumatic vibrator 122 is eliminated completely and a series of prgram steps are recorded during the teaching operation which follow the program step calling for movement of the manipulator arm 24 to the full insertion position 80a. This group of program steps, which may comprise, for example twenty program steps, call for movement of the manipulator arm 24, and hence the head portion 80, in a plane transverse to the insertion axis 30 so that the manipulator arm member 24 and the assembly 20 are bodily displaced in a series of positions very closely spaced around the insertion axis 30 as indicated by the dotted arrows 190 and in FIG. 1. The head portion 80 is thus caused to move through a predetermined search area in relatively small increments around the insertion axis 30 so that during this movement in the search area surrounding the axis 30 the exact axial alignment of the interfitting parts will be achieved and the member 80 moved to the full insertion position 80a by the force of the biasing spring 46, it being recalled that in this embodiment no angular orientation such as for the keyway 86 and key 88, is contemplated.

When a predetermined transverse search area is thus defined by a series of program steps following the full insertion position program step, the flip-flop 170 in FIG. 4 remains set after the full insertion position of the member 24 is achieved and the first program step of the search series is selected by production of a total coincidence signal at the output of the AND-gate 780. Each of the twenty program steps in the search series is accompanied by an auxiliary control signal so that the flip-flop 170 is not reset until the program step following the search series is selected.

The manipulator arm 24 and hence the head portion 80 is thereafter displaced laterally to the position called for by the first program step of the search series and when this position is achieved another total position signal is produced by the OR-gate 586 and is transmitted through the OR-gate 172 to the total coincidence AND-gate 780. Since the AND-gate 780 remains uninhibited, a total coincidence signal is produced, and the head portion 80 is thus rapidly moved to the different offset positions defined by the series of twenty program steps in the search series, it being understood that these positions are clustered about the main insertion axis 30 so that the head portion 80 is rapidly moved through a search area centered around the insertion axis 30 is somewhat the same manner as when the body portion 34 is vibrated by the vibrator 122.

During this movement of the head portion 80 over the area defined by the search series of program steps, the insertion axes of the interfitting parts will become exactly aligned and the spring 46 will force the head portion 80 into the opening 82 to the desired full insertion position 80a. When this occurs the limit switch 54 is returned to its initial position and the contacts 54b are closed so that an artificial coincidence signal is produced on the conductor 182 and supplied through the OR-gate 172 and the AND-gate 780 to select the next program step. However, since this insertion of the part may occur before the entire series of twenty steps in the program series of search steps have been performed it may be desirable to disable further movement of the hydraulic acutators in the five controlled axes of the manipulator apparatus so that the fingers 60, 62, which remain in gripping engagement with the portion 78, will not attempt to move the part after it has been interfitted within the opening 82. To this end, the artificial coincidence signal produced by the AND-gate 178 in the manner described above, is also supplied through a diode 192 to the output conductor 765 of a ramp generator 764.

The ramp generator 764 is described in detail in said copending Dunne, et al,. application and is employed to develop an inhibiting signal on the conductor 765 during periods when it is desired to disable movement of the hydraulic actuators in the respective five controlled axes of the machine. Thus, the conductor 765 is supplied to the respective diodes 750, 752, 754, 756 and 758 which control the input to the servo amplifiers in the five different axes and when a ground signal is supplied to the conductor 765 the inputs of all five servo amplifiers are grounded and prevent further movement of the hydraulic actuators in the respective axes, as described in detail in said copending Dunne, et al., application. Accordingly, when a signal is supplied through the diode 192 to the conductor 765, the inputs of all five servo amplifiers are grounded and further movement in all five controlled axes is thereafter prevented. The remaining ones of the twenty program steps constituting the search series may now be selected in rapid succession since the artificial coincidence signal developed on the conductor 182 remains until the flip-flop 170 is reset on the program step immediately following the twenty program steps of the search series. Furthermore, movement of the manipulator arm to the respective positions called for by the remaining steps in the search series is not performed, because as soon as the next program step is selected, an artificial coincidence signal is produced on the conductor 182 and the next program step is selected without moving the manipulator arm to the position indicated by the previous program step. However, when the entire series of twenty program steps has been sequentially selected and the next program step is selected at which no auxiliary control signal is recorded, the flip-flop 170 is reset so that the AND-gate 178 is disabled, the artificial coincidence signal is terminated on the conductor 182 and the diode 192 is rendered nonconductive so that the servo amplifiers are thereafter enabled to move the manipulator arm to the position requested by the next program step. In this connection it will be understood that the disabling of the servo amplifiers by means of the above-described diode 192 may be eliminated in the event that the scanning of the remaining steps of the search series is performed in a very short period of time so that the fingers 60, 62 become disengaged from the part relatively shortly after it has been moved to the full insertion position 80a.

In the above-described arrangement a series of twenty search series program steps are required at each position at which a part is to be inserted. If a number of such clusters of search program steps are required in a given multi-step program, a large storage capacity is required in the memory storage portion of the manipulator control apparatus. In FIGS. 5, 6 and 7 an arrangement is disclosed for establishing a predetermined search pattern around a given insertion axis, this search pattern being established independently of the main storage facilities of the manipulator apparatus and may be called upon to perform a search operation of predetermined configuration at any one of a number of insertion axes at various program steps of a multi-step program so that the program step storage facilities of the manipulator apparatus may be substantially smaller and still provide for insertion of one interfitting part within another at a number of points in a given multi-step program.

Specifically, the arrangement of FIGS. 5 to 7, inclusive, is capable of developing a spiral search pattern starting at any full insertion program step of the program in which the spring 46 is compressed and the head portion 80 has been moved into engagement with the lip 120 of the interfitting part 84. More particularly, and referring to FIG. 6, the insertion axis 30 along which the manipulator arm 24 is moved to place the interfitting parts in engagement is indicated as the center point 200 in this figure. With the control arrangement of FIG. 5, the manipulator arm, and hence the head portion 80 is caused to move in an outwardly increasing modified spiral starting with the center point 200, the increments of motion of each segment of this modified spiral being chosen in accordance with the accuracy requirements of alignment between the insertion axes of the two interfitting parts. In the illustrated embodiment, it has been assumed that the insertion axis 30 is essentially horizontal so that correlated movements of the manipulator arm in the rotary axis, identified as the X direction in FIGS. 6 and 7, and movements in the down-up axis, identified as the Y-axis in FIGS. 6 and 7 will be effective to move the head portion in a generally outwardly increasing modified spiral while maintaining the insertion axis of the head portion 80 generally parallel to the initial insertion axis 30 to which the manipulator arm has been programmed to move. In FIG. 1 the down-up movement of such modified spiral would correspond to movement in the direction of the arrow 202 in FIG. 1 and movement in the rotary axis would produce motion of the head portion 80 in a direction essentially perpendicular to both the arrow 202 and the axis 30, i.e., into the plane of the paper in FIG. 1.

In the arrangement of FIG. 5, the spiral search pattern consists of a first increment of motion 204 in the plus X direction, this increment of motion having an arbitrary distance value of plus 1. This incremental motion in the plus rotary direction is achieved by generating a binary number in a binary counter and adding or subtracting this number from the number generated by the rotary encoder when the manipulator arm 24 is in the fully insertion position 80a along the axis 30. Since the rotary encoder is continuously producing a binary signal representing the absolute position of the manipulator arm at the center point 200 of the spiral scan pattern, the output of this binary counter may simply be added to the encoder number and the new resultant number is interpreted by the manipulator arm control apparatus as a new command signal even though no new command signal has been generated by selection of another program step in the program recorded during the teaching operation. The manipulator arm then physically moves to the position 206 and when a total coincidence signal is produced indicating movement to the point 206, a second binary counter develops a plus 1 signal representing an increment of motion 208 in the plus Y direction, i.e., the up direction of the down-up axis, thereby calling for movement of the manipulator arm to the point 210 even though no new command signal has been generated by selection of another program step.

It will be noted that while the manipulator arm is moving from point 206 to 210, the required binary number in the X or rotary axis does not change. Accordingly, alternate instructions can be given to the two counters controlling the rotary and down up axes and if these instructions are increased by one increment each time, the resultant scanning pattern shown in FIG. 6 results, if the sign of each increment is reversed on alternate increments in that axis. Thus, if a negative increment of minus two is now introduced into the X or rotary axis, movement in the minus X direction 212 is called for so that the manipulator arm is moved to the point 214 while the Y axis remains constant. The next increment of minus two, i.e., calling for motion along the line 216 is fed to the down up axis which moves the manipulator arm down to the point 218. It will thus be evident that successive motions of alternately opposite polarity are applied to the rotary and down up axes so as to produce the scanning pattern shown in FIG. 6.

In FIG. 7 the increments of motion required in both the rotary and down up axes are tabulated and it will be evident from the table shown in FIG. 7 that the desired search pattern is achieved if the rotary binary counter successively produces increments of plus one, minus two, plus three, minus four, etc. Also, the same series of increments are required by the counter being compared with the down up encoder except for the fact that the plus one increment for the down up counter is generated during the off or unchanging intervals of the rotary counter.

Referring now to FIG. 5, a control circuit arrangement is shown therein whereby the above-described series of alternately positive and negative binary increment numbers may be generated in response to movement of the manipulator arm 24 to the full insertion position 24a. As in the previously described embodiments in FIGS. 3 and 4, an auxiliary control signal is recorded in association with the program step which commands the manipulator arm 24 to move to the position 24a. Accordingly, when this position is achieved and the coil spring 46 compressed, an enabling signal is developed on the conductor 134 which enables the AND-gate 132 since the limit switch contacts 54a are closed as the coil spring 46 is compressed. The output of the gate 132 on the conductor 138 is supplied to a one-shot multivibrator 230 which develops a single pulse in the output circuit thereof which is fed to a binary flip-flop 232. The binary flip-flop 232 is arranged to supply alternate ones of the pulses from the one-shot 230 to the two output leads 234 and 236 thereof, the first pulse on the conductor 234 being supplied to a five bit gray code counter 238, and the second and alternate pulses thereafter developed by the flip-flop 232 being supplied over the conductor 236 to a five bit gray code counter 240.

The 1 outputs of the five stages of the gray code counter 238 are supplied to the gray-to-binary code converter portion 242 of a comparator indicated generally at 244, the other gray-to-binary code converter portion 246 of which is supplied with the respective digits E-1, E-2 to E-13 of the rotary encoder 326. As discussed in detail in said copending Dunne, et al., application, the rotary encoder is arranged to provide a binary number in gray code corresponding to the absolute position of the manipulator arm 24 in the rotary axis. Since in the illustrated embodiment the gray code counter 238 is arranged to provide only a five bit number corresponding to a maximum spiral scan pattern of five successively larger increments in the X or rotary direction, the remaining inputs C-6 to C-13 of the gray to binary code converter 242 are simply connected to ground. However, it will be understood that if a larger spiral search pattern is required then a counter 238 of larger capacity may be required and the corresponding outputs of the respective stages compared with the corresponding outputs of the rotary encoder 326, as modified by the gray-to-binary code converter 246. The full adder portion 248 of the comparator 244 is arranged to compare the binary number developed by the counter 238 with the binary number developed by the rotary encoder 326, as converted to binary code by the converters 242 and 246, and develops on the output conductors 248 thereof a set of digital signals corresponding to the sum of these two binary input numbers.

Since alternate increments in both the rotary and down up axes are of opposite polarity, it is necessary to subtract alternate numbers developed by the counter 238 from the number developed by the rotary encoder 326. Also, it will be noted from the table in FIG. 7 that all of the negative numbers which must be subtracted are even, whereas all of the positive numbers which should be added to the rotary encoder 326 are odd. Accordingly, if an odd-even detection of the count in the counter 238 is made and is employed to control the gray-to-binary code converter 242, subtraction by complementary addition may be performed in the full adder 248 with the resultant desired movement of the manipulator arm. To this end, a series of exclusive OR-gates 250, 252, 254, and 256 are connected to the 1 outputs of the five stages in the counter 238 so that a signal is developed on the output conductor of the final exclusive OR-gate 256 which is transmitted over the conductor 258 to the complementing lead of the grayto-binary code converter portion 242. The signal on the conductor 258 will have one value when the number developed by the counter 238 is even and will have the opposite value when the number developed in the counter 238 is odd. This complementing signal is then employed in the gray-to-binary code converter 242 to either transmit the converted binary number from the counter 238 directly to the full adder 248 or to transmit the complement of this number when the number developed in the counter 238 is an even number. Accordingly, the comparator 244 is capable of developing on its output conductors 248 a number which is the sum of the rotary encoder number and the number developed by the counter 238 when the counter number is an odd number and will also develop a number which is the difference between the rotary encoder number and the counter number when the counter number is an even number.

A similar comparator 260 is also provided for comparing the number developed by the counter 240 with the number developed by the down-up encoder 314. Thus, the five binary gray code digits developed by the counter 240 are supplied directly to the five lowest order inputs of the gray-to-binary code converter portion 262 of the comparator 260 and the exclusive OR-gates 264, 266, 268 and 270 are employed to develop an odd-even signal which is transmitted over the conductor 272 to the complementing input of the converter 262. The gray code output of the down-up encoder 314 is supplied to a gray-to-binary code converter portion 274 and the full adder 276 functions to develop on its output conductors 278 a binary code output signal equal to the sum of the down up encoder number and the number developed by the counter 240 when the counter number is an odd number and equal to the difference between these two numbers when the counter number is even.

In the control circuitry of the manipulator apparatus described in said copending Dunne, et al., application a multiplexing arrangement is employed for comparing the respective encoder signals with the respective command signals in the five controlled axes of the machine so that only a single main comparator is required for all five controlled axes. A similar arrangement is employed in the present invention disclosed in FIG. 5 wherein the multiplex switch 416 is employed to select sequentially the five control axes of the manipulator and at the same time the command signals corresponding to each axis are applied to the main comparator through another multiplex switch section, this main comparator then providing an error signal which is converted to analog form and is employed to drive the respective servo amplifiers and actuate the respective hydraulic actuators in each of the five controlled axes so as to move the arm to the position indicated by the respective command signals.

Since the multiplex arrangement described in said copending Dunne, et al., application is one in which the multiplexed encoder signals corresponding to each axis are in gray code form, it is necessary to convert back from binary to gray code in the output of each of the comparators 244 and 260 so that the modified rotary encoder signal and down-up encoder signals may be multiplexed along with the other encoder signals from the three other axes. Accordingly, the output from the comparator 244 on the conductors 248 is supplied to a binary-to-gray code converter 280 the output of which is supplied to the terminals 414 of the multiplex switch 416 and the output from the comparator 260 on the conductors 278 is supplied to a binary-to-gray code converter 282 so that a corresponding gray code is supplied to the terminals 410 of the multiplex switch 416.

Considering now the operation of the control arrangement shown in FIG. 5, when the full insertion position 24a of the manipulator arm 24 is reached, an output is developed on the conductor 138 of the AND-gate 132 which is supplied to the one-shot 230. The one-shot 230 supplies a corresponding pulse of uniform amplitude and duration to the binary flip-flop 232 which responds by providing a first control pulse on the conductor 234 which is supplied to the five bit gray code counter 238. Accordingly, a gray code number of 1 is provided in the output of the counter 238 and since this number is an odd number no corresponding complement signal is produced on the conductor 258.

The gray code number of 1 in the counter 238 is then converted to binary code in the converter 242 and is added to the number appearing in the output of the converter 246 which corresponds in binary form to the actual position of the rotary encoder 326. As a result, the output of the comparator 244 is increased by one least significant digit increment and the main comparator of the manipulator control apparatus responds to this modified encoder signal by moving the manipulator arm one increment in the plus X direction, i.e., to the point 206 in FIG. 6. When this movement has been accomplished the rotary encoder 326 now produces a gray code number which is one least significant digit less than the previous encoder number since the manipulator appartus moves the arm in the direction to reduce the error signal to zero. Since the command signal and the modified encoder signal output of the comparator 244 are now equal, the manipulator arm 24 will remain at this position in the rotary axis during the next incremental movement in the Y-axis, or up-down axis.

When the counter 238 was pulsed and a modified encoder signal produced by the comparator 244, coincidence between command and encoder signals no longer existed and accordingly the position coincidence signal formerly developed on the lead 134 at the output of the OR-gate 586 disappears. However, when the manipulator arm has been moved to the point 206 coincidence again is established between the command signal and the modified encoder signal in the rotary axis and hence another enabling signal is produced on the lead 134. This enabling signal is passed through the AND-gate 132, since the other inputs of this AND-gate continue to be enabled. Accordingly, the one-shot 230 is again pulsed and provides a second pulse to the binary flip-flop 232. This pulse is distributed on the conductor 236 to the counter 240 and has the effect of stepping this counter to the first or least significant digit number, i.e., the digit 1. This gray code digit 1 in the counter 240 is compared with the gray code reading of the down-up encoder 314 in the comparator 260 in a manner entirely identical to that described in detail heretofore in connection with the comparator 244, with the result that a modified encoder signal is produced on the conductors 278. This modified encoder signal is again supplied to the main comparator through the multiplex switch 416 and an error signal is developed which moves the manipulator arm in the down up axis, i.e., the Y direction, to a point such that this error signal is reduced to zero during which time the arm is moved in the Y-axis plus one increment to the position 210 shown in FIG. 6. During this motion in the Y-axis the count in the counter 233 remains the same since no further pulse has been supplied to this counter over the lead 234.

When a position coincidence signal is again produced at point 210 another enabling signal is produced on the lead 134 so that the one-shot 230 produced another output pulse and the binary flip-flop 232 provides a second input pulse over the lead 234 to the counter 238. The count in this counter is now 2 in gray code but this number should be subtracted from the number developed by the rotary encoder 326 since, as indicated in FIGS. 6 and 7, movement in the minus X direction along the line 212 to the point 214 is required for the modified spiral pattern illustrated in these figures. Since the number 2 in the counter 238 is an even number, a complement signal is developed on the lead 258 from the chain of exclusive OR-gates 250 to 256, inclusive, so that the complement of the number developed in the counter 238 is supplied to the full adder 248. Accordingly, a modified rotary encoder signal is developed on the conductors 248 which calls for movement of the manipulator arm to the position 214.

It will thus be seen that the desired modified spiral patteren of FIG. 6 is accomplished by successively distributing pulses to the two counters 238 and 240 and supplying the complement of each number when an even number is present in the counter so that the modified spiral pattern may be set up, this pattern being established entirely automatically following programmed movement of the manipulator arm 24 to the full insertion position 24a.

During the above-described spiral movement of the manipulator arm 24 the head portion 80 will come into exact coincidence with the opening 82 and the force of the biasing spring 46 will cause this part to move into the opening 82 to the full insertion position 80a. When this occurs, further spiral scanning movement of the manipulator arm should be terminated and the counters 238 and 240 should be reset so that the spiral search pattern can be repeated at the next programmed point at which two parts are to be interfitted. To this end, the output of the one-shot 230 is supplied to the set terminal of a flip-flop 290 so that the flip-flop 290 is set when the first pulse is produced in the output of the one-shot 230 and the counter 238 is set to move to the first X increment point 206. The flip-flop 290 remains thereafter set until the parts become interfitted and the head portion 80 moves to the full insertion position 80a. When this occurs a third set of contacts 54c on the limit switch 54 are closed so that an enabling potential is supplied from a suitable potential source over the conductor 292 to a two-input AND-gate 294 the other input of which is the output of the flip-flop 290 which is supplied over the conductor 296. The AND-gate 294 is thus enabled when the parts become interfitted, irrespective of the point at which this is accomplished in the predetermined spiral search pattern of FIG. 6, and when the AND-gate 294 develops an output this signal is supplied through a delay network 298 back to the reset terminal of the flip-flop 290 so that the flip-flop 290 is reset to its initial condition. At the same time the output of the AND-gate 294 is supplied over the conductor 300 to one input of a two-input OR-gate 172 the other input of which is the position coincidence signal developed in the output of the OR-gate 586. The output of the OR-gate 172 is supplied as one input of the total coincidence AND-gate 780. However, the AND-gate 780 is also controlled by an enabling signal which is supplied to the normally closed limit switch contacts 54b and over the conductor 302 to the AND-gate 780. The limit switch contacts 54b are opened when the manipulator arm 24 is moved to the full insertion position 24a and the coil spring 46 is compressed. Accordingly, during all of the above-described motions of the manipulator arm to establish the spiral scanning pattern of FIG. 6, the AND-gate 780 does not provide a total coincidence signal and hence the next program step in the recorded program is not selected but instead the command signals corresponding to the full insertion position 24a of the manipulator arm 24 in each axis are retained for comparison with the modified encoder signals developed in the manner described above for the rotary and down-up axes. However, when the parts become interfitted and the limit switch is returned to its initial position, the contacts 54b are closed and an enabling signal is supplied over the conductor 302 to the AND-gate 780. The AND-gate 780 is thus fully enabled and develops a total coincidence signal which is supplied to the manipulator control apparatus so that the next program step of the recorded program is selected in a manner described in detail in said copending Dunne, et al., application.

From the above-detailed description of the circuit arrangement of FIG. 5, it will be evident that the increments of movement of the spiral scan pattern of FIG. 6 may be as small as the least significant digit of each of the encoders 326 and 314. Furthermore, the spiral scanning pattern may be extended beyond the above illustrated value of five increments in the X and Y directions by simply employing counters 238 and 240 having a larger capacity than five bits.

Movement of the manipulator arm 24 by only one least significant digit increment in both the X and Y directions around the central insertion axis point 200 will normally be sufficient to cause the head portion 80 to come into alignment with the opening 82 at some point in the spiral scan. However, if desired, a pneumatic vibrator 122 may be attached to the body portion 34 so that the head portion 80 is vibrated at the same time it is moved in the spiral scan pattern of FIG. 6. In the circuit arrangement of FIG. 5, the pneumatic vibrator would be energized from the output of the flip-flop 290 by means of a pneumatic relay 140 and this vibration would continue as long as the flip-flop 290 remains in the set condition. Also, in the circuit of FIG. 5 a solenoid control circuit 162 is provided to respond to a recorded solenoid signal so that the solenoid members 94 and 96 are removed from the path of movement of the body portion 32 at the start of the program step to move the manipulator arm to the full insertion position 24a, as described in detail heretofore in connection with the embodiments of FIGS. 3 and 4.

In all of the embodiments described thus far, the body portion 34 which grips the article to be inserted is slidably mounted with respect to the body portion 32 and the spring 46 is compressed to provide the necessary biasing force to promote insertion of the parts when the exact axial alignment or angular orientation is produced. However, each of the control arrangements shown in FIGS. 3, 4 and 5 may equally well be employed with the alternative arrangement of FIG. 2 wherein a conventional manipulator arm is employed to grasp the part to be inserted and the interfitting part is spring biased for movement along the insertion axis. Thus, referring to FIG. 2, the grasping fingers 60a and 62a of a conventional manipulator apparatus are employed to grasp the shank portion 78 of the part to be inserted and move this part along the insertion axis indicated by the arrow 30a. However, the part 84a into which the head portion 80 is to be inserted is in the form of a collar which is mounted in a support member 310 which is itself slidably mounted in a fixed member 312, the body 310 being normally urged against an annular stop member 313 by means of the coil spring 316. A limit switch 54a, which corresponds in all respects to the limit switch 54 in the embodiment of FIG. 1, is mounted on a bracket 318 secured to the support wall 312 and the control lever 52a of the switch 54a is biased into engagement with the rear edge of the movable support member 310.

Considering now the operation of the alternative arrangement shown in FIG. 2, when the head portion 80 of the part which is gripped by the manipulator fingers 60a and 62a is moved along the insertion axis 30a to a point at which it engages the lip portion 120a, the head portion continues to move in the direction of the arrow 30a so that the support member 310 is moved rearwardly to the full insertion position shown in dotted lines at 310a in FIG. 2 while the spring 316 is compressed. During this movement of the support member 310 the control lever 52a is moved to the position shown in dotted lines in FIG. 2 so that the limit switch 54a is actuated in a manner similar to the actuation of the switch 54 in the arrangement of FIG. 1. The coil spring 316 thus acts to provide a biasing force tending to promote the insertion of the part to be interfitted in a manner similar to the biasing spring 46 in the embodiment of FIG. 1. After the manipulator arm has moved the head portion 80 to the full insertion position which has been programmed for the manipulator arm, any of the control arrangements described heretofore in connection with FIG. 3, FIG. 4 or FIG. 5 may be employed to move the head portion relative to the part 84a, or rotate said head portion to change the angular orientation thereof, so that the parts become interfitted in the desired manner. As the parts become interfitted the coil spring 316 functions to move the support member 310 back against the stop 313 as the part 84a is moved into interfitting relationship with the head portion 80. In this connection it will be noted that in the embodiment of FIG. 2 the part 84a is moved during the interfitting operation, whereas in the embodiment of FIG. 1 the other part, i.e., the head portion 80 is moved to the interfitting position while the part 84 remains fixed.

While all of the previously described embodiments have contemplated that one of the two interfitting parts is fixed and the other part is gripped by a manipulator arm and moved into engagement therewith, it is contemplated by the present invention that two programmable manipulator units may be positioned in proximity to one another and one manipulator apparatus may be programmed to hold one of the two interfitting parts at a predetermined or programmed location while the other manipulator apparatus is employed to grasp the other interfitting part and convey it from a supply point into interfitting engagement with the part held by the other manipulator arm in the manner described heretofore in connection with any of the previous embodiments. Thus, in the embodiment of FIG. 1, the part 84 may be gripped by the gripping fingers of a separate manipulator apparatus and moved to the position shown in FIG. 1 in alignment with the insertion axis 30. The manipulator arm 24 is then moved in the manner described in detail heretofore in connection with any of the previously discussed embodiments until the parts are in full interfitting relationship. When two parts to be interfitted are thus gripped by two separate manipulator arms and positioned along a common insertion axis, it will be evident that the accuracy with which these parts may be oriented relative to one another will depend upon the accuracy of both hydraulic actuator systems of the two manipulator arms and hence the various embodiments described in detail heretofore for obtaining exact alignment of the parts and angular orientation thereof will be even more important than in the situation where one of the parts is fixedly mounted to a high degree of accuracy.

In the embodiments employing the arrangement of FIG. 2, the part 84a may be gripped by the gripping fingers 60, 62 of the manipulator arm 24 shown in FIG. 1 and the part 80 may be gripped by the fingers 60a, 62a of a second conventional manipulator apparatus. Also, the various interfitting parts may obviously be reversed in function insofar as the interfitting operations described in detail heretofore are concerned.

While there have been illustrated and described various embodiments of the present invention, it will be apparent that various changes and modifications thereof will occur to those skilled in the art. It is intended in the appended claims to cover all such changes and modifications as fall within the true spirit and scope of the present invention.

What is claimed as new and desired to be secured by Letters Patent of the United States is:

1. Programmed manipulator apparatus for interfitting one part with another part, said pair of parts being interfitted by movement along an insertion axis comprising in combination a manipulator arm, means for moving said arm in a plurality of axes, article gripping means carried by said arm, program control means for controlling said article gripping means to seize one of said pair of interfiting parts and for controlling said arm to move the seized part to an insertion position at which said seized part is in engagement with the other part of said pair of interfitting parts, means operative upon movement of said arm to said insertion position for exerting a biasing force on said parts along said insertion axis and in the direction to cause said parts to be interfitted, and means for moving one of said parts relative to the other by an amount such that said biasing force urges said parts into interfitting relationship by movement along said insertion axis.

2. The combination of claim 1, wherein said relative movement is produced by vibrator means associated with one of said parts and operative to produce a change in the position of said one part relative to the other part which is sufficient to permit said biasing force to urge said parts into said interfitting relationship.

3. The combination of claim 1, wherein said article gripping means is movable relative to said arm and said biasing force is developed by a coil spring positioned between said article gripping means and said arm, said coil spring being compressed when said arm is moved to said insertion position.

4. The combination of claim 1, which includes spring means for developing said biasing force as said arm is moved to said insertion position.

5. The combination of claim 3, which includes vibrator means associated with one of said parts, switch means controlled by relative movement between said arm and said article gripping means as said arm is moved to said insertion position, and means including said switch means for energizing said vibrator means.

6. The combination of claim 5, which includes means responsive to movement of said parts into said interfitting relationship for de-energizing said vibrator means.

7. The combination of claim 1, in which said part moving means comprises means for rotating one of said parts about said insertion axis while said manipulator arm is in said insertion position.

8. The combination of claim 7, which includes means responsive to the interfitting of said parts by movement along said insertion axis for disabling said part rotating means.

9. The combination of claim 3, which includes means for selectively preventing movement of said article gripping means relative to said arm.

10. The combination of claim 9, wherein said selective means comprises a member interposed between said article gripping means and said arm, and means for selectively moving said member to a non-interposing position in which said article gripping means may be moved relative to said arm.

11. The combination of claim 1, wherein said program control means includes a series of recorded program steps, means for sequentially sensing said stored program steps, means controlled by said sensing means for controlling said moving means to move said arm to the position indicated by a sensed program step, means for developing a total coincidence signal when movement of said arm in all of said axes has been completed for the sensed program step, means for disabling said coincidence signal developing means when said arm is moved to said insertion position, and means responsive to movement of said parts into said interfitting relationship for controlling said sensing means to select the next program step in said series.

12. The combination of claim 11, which includes vibrator means associated with one of said parts, and means for energizing said vibrator means when said arm is moved to said insertion position.

13. The combination of claim 12, which includes means for de-energizing said vibrator means when said parts are moved into said interfitting relationship.

14. The combination of claim 13, which includes means for disabling said arm moving means when said vibrator means is energized.

15. The combination of claim 1, wherein said program control means includes a series of recorded program steps, means for sequentially sensing said stored program steps, means controlled by said sensing means for controlling said moving means to move said arm to the position indicated by a sensed program step, an auxiliary control signal recorded in association with the program step following the insertion position step of said series, means for sensing said control signal, means responsive to said control signal for rotating said article gripping means about said insertion axis, and means responsive to movement of said parts to said interfitting relationship for terminating rotation of said article gripping means.

16. The combination of claim 15, which includes means responsive to movement of said parts to said interfitting relationship for selecting the next program step in said series.

17. The combination of claim 3, which includes switching means actuated by movement of said article gripping means relative to said arm, and means for controlling said part moving means in accordance with the actuation of said switching means.

18. In a programmed manipulator apparatus, the combination of, a manipultor arm, means for moving said arm along a predetermined path, means for developing a digital command signal representing a desired position of said arm, means for developing a digital position signal representing the actual position of said arm, means for comparing said command and position signal to develop a digital error signal, means responsive to said error signal for controlling said arm moving means to move said arm in the direction to reduce said error signal, and means for sequentially altering said digital position signal so that it differs from the actual position of said arm by a series of predetermined offset increments, whereby said arm is sequentially moved to a series of positions which are offset from said desired position in a predetermined search area around said desired position.

19. The combination of claim 18, which includes means for selectively varying the amount by which said arm is offset from said desired position.

20. The combination of claim 18, which includes means for developing a digital offset signal representing a desired increment of offset from said desired position, second comparing means for comparing said digital position signal and said digital offset signal, to develop a modified position signal, and means for supplying said modified position signal to said first named comparing means so that said digital error signal is altered by the amount of said digital offset signal.

21. The combination of claim 20, which includes means for sequentially varying the value of said digital offset signal so that said arm is sequentially moved to different offset positions in the vicinity of said desired position without changing said digital command signal.

22. The combination of claim 18, wherein article holding means are provided on the end of said manipulator arm and movable with respect thereto, said article holding means being arranged to hold one part of a pair of interfitting parts so that said arm may be moved to an insertion position in which said one part may be inserted into the other part, and means for selectively varying said offset increment so that said one part is selectively moved to different positions around said insertion position to facilitate interfitting of said parts without changing said command signal.

23. The method of interfitting one part with another part, said pair of parts being interfittable by movement along an insertion axis, which comprises the steps of supporting one of said parts at an insertion station, controlling a programmable manipulator arm to grasp the other of said pair of parts and move it along said insertion axis toward said one part at said insertion station, and moving one of said parts in a predetermined search area around said insertion axis, thereby to facilitate interfitting of said pair of parts.

24. The method of interfitting one part with another part, said pair of parts being interfittable by movement along an insertion axis, which comprises the steps of supporting one of said parts at an insertion station, controlling a programmable manipulator arm to grasp the other of said pair of parts and move it along said insertion axis toward said one part at said insertion station, and vibrating said other part as it is moved along said insertion axis, thereby to facilitate interfitting of said pair of parts at said insertion station despite slight inaccuracies in the movement of said manipulator arm along said insertion axis.

25. The method of claim 24 which includes the step of disabling the driving movement of said manipulator arm during vibration of said other part prior to the interfitting of said pair of parts.

26. The method of interfitting one part with another part, said pair of parts being interfittable by movement along an insertion axis when having a predetermined alignment relative to one another, which comprises the steps of supporting one of said parts at an insertion station, controlling a programmable manipulator arm to grasp the other of said pair of parts and move it into engagement with said one part, developing a biasing force between said parts as they are engaged which is in the direction to cause said parts to be interfitted when having said predetermined alignment, and moving one of said parts relative to the other to provide said predetermined alignment along said insertion axis while maintaining said biasing force between said parts.

27. In programmable manipulator apparatus of the type having a manipulator arm movable along a plurality of axes and program control means for moving said arm to a series of positions corresponding to a sequence of recorded program steps, the method of interfitting one part with another part, said pair of parts being interfittable by movement along an insertion axis, which comprises the steps of supporting one of said parts to an insertion station, sequentially sensing said program steps so that the other of said pair of parts is moved from a pickup station to said insertion station by said manipulator arm and is moved into engagement with said one part at said insertion station to establish a biasing force therebetween, and controlling said manipulator arm independently of said recorded program steps to move said other part into said interfitting relationship with said one part.

28. The method of claim 26, which includes the step of vibrating said manipulator arm independently of said recorded program steps and by an amount sufficient to align said parts along said insertion axis so that said biasing force moves the aligned parts into said interfitting relationship.

29. The method of claim 26, which includes the step of sequentially adding small increments to the sensed program step corresponding to said insertion station position of said arm, whereby said other part is aligned with said one part along said insertion axis and said biasing force moves the aligned parts into said interfitting relationship.

30. In programmable manipulator apparatus of the type having a manipulator arm movable along a plurality of axes, an article pickup hand connected to the end of said arm and program control means for moving said arm to a series of positions corresponding to a series of recorded program steps, the method of interfitting one part with another part, said pair of parts being interfittable by movement along an insertion axis, which comprises the steps of recording a first group of program steps corresponding to movement of said arm from a pickup station to an insertion station, then recording a second group of program steps, corresponding to different positions of said pickup hand spaced about said insertion axis and with said arm remaining at said insertion station position, supporting one of said pair of parts at said insertion station, sequentially sensing said first group of recorded program steps so that the other of said pair of parts is moved from said pickup station to said insertion station by said manipulator arm, sequentially sensing said second group of recorded program steps so that said other part is moved to said different positions spaced about said insertion axis, and terminating sensing of said second group of recorded program steps when said pair of parts is moved into said interfitting relationship.

31. The method of claim 30, which includes the step of moving the other of said parts into engagement with said one part at said insertion station and establishing a biasing force therebetween as said other part is sequentially moved to said different positions spaced about said insertion axis.

32. The combination of claim 1, wherein said article gripping means is mounted on the end of said arm and said relative movement is produced by vibrator means associated with said article gripping means, and means for preventing transmission of the vibrations of said article gripping means to said arm.

33. In a programmed manipulator apparatus, the combination of, a manipulator arm, means for moving said arm, means for developing a digital command signal representing a desired position of said arm, means for developing a digital position signal representing the actual position of said arm, means for comparing said command and position signals to develop a digital error signal, means responsive to said error signal for controlling said arm moving means to move said arm in the direction to reduce said error signal, means operative when said error signal has been reduced to a predetermined value for developing a digital offset signal representing a desired increment of offset from said desired position, and means jointly responsive to said digital offset signal, said command signal and said position signal for controlling said arm moving means to move said arm by said desired increment of offset from said desired position.

34. The combination of claim 33, which includes means for varying said digital offset signal in a series of predetermined offset movements so that said arm is sequentially moved to a series of positions which are offset from said desired position.

35. The combination of claim 34, wherein said arm is movable in two different directions relative to said desired position, and said digital offset signal is employed to control movement of said arm in said different directions so that said series of offset positions define a predetermined search area around said desired position.

36. The combination of claim 35, wherein said predetermined search area comprises a pattern in the form generally of a spiral about said desired position.

37. The combination of claim 35, wherein two digital offset signals are developed to control movement of said arm in said different directions, and means for alternately changing the magnitude and sign of said two digital offset signal, so that said arm is moved in a modified spiral search pattern about said desired position.

* * * * *